United States Patent Office 2,759,794
Patented Aug. 21, 1956

2,759,794

PURIFICATION OF MAGNESIUM CHLORIDE SOLUTIONS

Charles H. Fuchsman, Corpus Christi, Tex., assignor to International Minerals & Chemical Corporation, a corporation of New York No Drawing. Application July 26, 1951,
Serial No. 238,787

6 Claims. (Cl. 23—91)

This invention relates to processes for the treatment of liquors to recover magneisum values therefrom, and more particularly to processes for the treatment of potassium sulfate reject liquors or their equivalents to recover magnesium compounds therefrom.

In the process of producing potassium sulfate by base exchange or metathesis of the magneisum content of langbeinite with the potassium content of potassium chloride, there is produced a mother liquor from which the potassium sulfate crystals have been separated. This mother liquor is usually evaporated and cooled in order to separate potassium chloride and leonite crystals from the liquor. The liquor from which the crystalline salts have been removed is generally sent to waste, even though it contains magnesium and potassium compounds. It would be desirable to recover saleable magnesium compounds from these potassium sulfate reject liquors if a commercially feasible process for recovery were available.

It is an object of the instant invention to provide a process for the recovery of magnesium compounds from liquors containing chlorides and sulfates of magnesium, potassium and sodium.

It is a further object of the instant invention to provide a commercially feasible process for the recovery of magnesium compounds from potassium sulfate reject liquors or their equivalents.

It is a further object of the instant invention to provide a commercially feasible process for the recovery from potassium sulfate reject liquors or their equivalents of magnesium chloride which may be processed to obtain other magnesium chemicals.

It is a further object of the instant invention to produce magnesium chloride, magnesium oxide, and hydrochloric acid from potassium sulfate reject liquors.

These and other objects of the instant invention will become more apparent upon a fuller understanding of the instant novel process as hereinafter set forth.

The instant invention involves the treatment of liquors containing chlorides and sulfates of magnesium, potassium, and sodium under conditions controlled as herein described in order to remove the potassium, sodium, and sulfate from the liquor and to recover a mixture comprising essentially magnesium chloride.

According to the general method employed in the instant novel process for the recovery of magnesium compounds from mixtures or liquors containing sulfates and chlorides of magnesium, potassium and sodium, the liquor, such as potassium sulfate reject liquor, is evaporated to a magnesium concentration of between about 8.0% and about 8.9% by weight. In this range of magnesium concentration, langbeinite precipitates from the evaporated mixture and is separated therefrom. To the hot liquor from which the solid material has been separated is added a calcium chloride solution under conditions as herein described to precipitate residual amounts of sulfate in the mixture as anhydrite. Anhydrite is separated from the liquor. The liquor is then evaporated to a point at which substantially all of the halite and all of the sylvite combined as carnallite crystallize from the liquor, which is at this point nearly saturated with respect to bischofite and has a magnesium chloride content of between about 36% and about 40% by weight. Solid material is separated from the resulting bischofite-containing liquor. The bischofite liquor is then evaporated at a temperature between about 170° C. and about 190° C. to between about 50% and 53% by weight, with concentrations of 52% to 53% preferred, of magnesium chloride. This liquor may be processed in order to obtain flaked magnesium chloride which is dried and decomposed by heating to produce magnesium oxide and hydrochloric acid.

The liquors which are employed as feed materials in practicing the instant process contain chlorides and sulfates of magnesium, potassium, and sodium. In one embodiment of the instant novel process, potassium sulfate reject liquors such as those produced in base exchange processes as above described and claimed in U. S. Patent No. 2,295,297, issued to Butt et al., and pending U. S. application Serial No. 166,715, filed June 7, 1950, and the like, are used. A typical potassium sulfate reject liquor suitable as feed material for the practice of the instant novel process contains between about 2.9% and about 3.2% potassium, between about 5.5% and about 6.5% magnesium, between 17% and 18% chlorine, between 5% and 7% sulfate, and small amounts of sodium.

By the term anhydrite as used in the description and claims is meant the synthetic anhydrous calcium sulfate, which is also known as soluble anhydrite or B-anhydrite. This term does not refer to the naturally occurring anhydrite or γ-anhydrite.

In this embodiment of the instant process, potassium sulfate reject liquor, having substantially the above analysis, is evaporated at a temperature of between about 100° C. and about 117° C. at atmospheric pressure to a magnesium concentration of between about 8% and about 8.9% by weight. The formation of langbeinite crystals during the evaporation is accompanied by a reduction of the sulfate concentration in the liquor. The langbeinite crystallizes from the magnesium chloride liquor which is then decanted or thickened, for example, in the conventional type thickener, which effects the separation of liquid substantially free of solids from a mixture containing solids and liquid. The underflow from the thickener, which contains the solid phase salts, that is langbeinite, sylvite, and halite, can be leached to obtain schoenite and can be recycled to the conventional base exchange process. About 80% of the sulfate ions and about 25% of the potassium values are removed in the underflow.

To the hot magnesium chloride-containing overflow liquor from the thickener is added an aqueous solution containing sufficient calcium chloride to remove the residual amount of sulfate ion remaining in the liquor. The overflow from the langbeinite thickener is heated to a temperature of between about 100° C. and about 115° C. and preferably to a temperature of about 110° C. prior to the addition of the calcium chloride solution. When calcium chloride is added to a hot langbeinite liquor, either polyhalite or anhydrite, or both, may form. Because polyhalite does not settle at a reasonable rate in the thickener and because it effects the removal of potassium sulfate, in practicing the instant novel process conditions are controlled so that anhydrite rather than polyhalite is formed. In the liquor employed in the instant process, increasing the temperature of the mixture and/or increasing the dilution of the mixture minimizes the formation of polyhalite.

In a preferred embodiment of the instant invention prior to the addition of the calcium chloride solution, the magnesium chloride-containing overflow from the thickener is heated to a temperature of between about 100° C.

and about 110° C. and diluted to a magnesium concentration of between about 6.7% and about 8%, preferably between about 7.2% and about 7.5%. In this step, temperature and concentration are closely controlled to effect anhydrite crystallization. The anhydrite which forms is separated by means of a thickener.

The overflow liquor from the anhydrite thickener is evaporated to a point near saturation with respect to bischofite by heating the liquor under vacuum or at atmospheric boiling temperatures. A temperature in the range between about 100° C. and about 115° C. at atmospheric pressure is preferably employed, although temperatures between about 60° C. and about 125° C., either under vacuum or at atmospheric pressure, may be employed. Carnallite and halite crystallize from the liquor and are separated from the magnesium chloride-containing liquor by means of a thickener. The underflow slurry containing carnallite and halite can be leached with water to recover the magnesium chloride content, and the leach solution is recycled to the langbeinite evaporation step.

The magnesium chloride-containing overflow from the thickener is evaporated to a magnesium concentration of between about 12.5% and about 13.2% by weight at a temperature of between about 170° C. and about 190° C., 12.5% magnesium concentration corresponding to approximately 50% magnesium chloride concentration and 13.2% magnesium concentration corresponding to approximately 53% magnesium chloride concentration. This evaporation step is carried out at a temperature between about 170° C. and about 190° C. because if the evaporator product is to be flaked, the amount of water which is driven off must be carefully controlled. When temperatures below about 170° C. are employed, an insufficient amount of water is removed and the evaporator product will not readily solidify in the subsequent flaking step. When temperatures above about 190° C. are employed, usually too much water is removed and the mixture crystallizes in the evaporator. The evaporated mixture is flaked by pouring the mixture onto a cold surface and flaking the solidified mass from the surface. The flaked magnesium chloride is decomposed by heating at a temperature between about 400° C. and about 700° C. in a kiln, and magnesium oxide and hydrochloric acid are recovered therefrom.

As a specific example of the process, the following serves merely as illustration and it is not intended that the scope of the invention be limited thereto.

EXAMPLE

Potassium sulfate reject liquor, having an analysis of approximately 3.0% potassium, 6.5% magnesium, 0.7% sodium, 18.3% chlorine, 6.0% sulfate, and about 65.5% water, was evaporated at a temperature between about 105° C. and 110° C. to the extent of about 26% by weight of the reject liquor. Solid langbeinite crystallized from the liquor and was separated from the liquor in a thickener. The underflow from the thickener consisted of about 59.5% solid phase and 40.5% liquid phase. About 80% of the sulfate and about 52% of the potassium values were removed in the underflow.

The composition of the solid phase in the underflow was calculated as follows (per 100 parts of thickener underflow):

| K | Mg | Na | Cl | SO₄ |
|---|---|---|---|---|
| 10.47 | 6.27 | 1.94 | 4.42 | 36.36 |

This analysis corresponds to approximately 4.9 parts of sodium chloride, 3 parts of potassium chloride, and 51.6 parts of langbeinite.

The magnesium chloride-containing overflow from the thickener was heated to a temperature of about 110° C. and was diluted to a magnesium concentration of about 7.2% by weight. An aqueous solution containing about 40% of calcium chloride was added to the hot solution. The anhydrite which formed was separated in a thickener as the underflow. The liquor overflowing from the thickener was evaporated at a temperature of between about 110° C. and about 115° C. to a magnesium chloride concentration of about 40%. The carnallite and halite present in the evaporated product were separated as the underflow in a thickener maintained at a temperature of about 105° C. The composition of the mixtures discharged from the thickener as overflow and underflow are shown in Table 1.

Table 1

|  | K | Mg | Na | Cl | SO₄ |
|---|---|---|---|---|---|
| Thickener Overflow | 0.59 | 10.16 | 0.25 | 30.55 | 0.15 |
| Thickener Underflow | 5.74 | 8.90 | 2.52 | 34.90 | 0.23 |

The thickener underflow contained about 39% carnallite, 6% halite, and 55% liquor. The magnesium chloride-containing overflow liquor was heated at a temperature between about 170° C. and about 190° C. to a magnesium chloride concentration of about 53%, and this concentrate was flaked and heated in a kiln at a temperature of between about 650° C. and about 700° C. to produce magnesium oxide and hydrochloric acid. The kiln product contained about 87% magnesium oxide. The magnesium recovery was about 70%.

Having thus fully described and illustrated the character of the invention, what is desired to be secured and claimed by Letters Patent is:

1. A process for the production of purified magnesium chloride solution which comprises evaporating a potassium sulfate reject liquor which initially contains magnesium in a concentration up to about 6.5% by weight to a magnesium concentration between 8 and about 8.9% by weight, separating solid material from the evaporated mixture, diluting the resulting liquor with water to a magnesium concentration of between about 6.7 and 8% by weight, heating the diluted mixture to a temperature between about 100° C. and about 115° C., adding a sufficient amount of calcium chloride to the hot liquor to precipitate residual sulfate ions from the solution as anhydrite, separating solid anhydrite material from the resulting mixture, evaporating the liquor from which the solid anhydrite material has been separated to magnesium chloride concentration of between about 36% and about 40% by weight, and separating solid material from the resulting magnesium chloride-containing liquor.

2. A process for the production of purified magnesium chloride solution which comprises evaporating a potassium sulfate reject liquor which initially contains magnesium in a concentration up to about 6.5% by weight at a temperature below about 117° C. to a magnesium concentration of between 8% and about 8.9% by weight, separating solid material from the concentrated mixture, diluting the resulting liquor with water to a magnesium concentration of between about 6.7% and 8% by weight, heating the diluted mixture to a temperature between about 100° C. and about 115° C., adding a sufficient amount of calcium chloride to the hot liquor to precipitate residual sulfate ions from the solution as anhydrite, separating solid anhydrite material from the resulting mixture, evaporating the liquor from which the solid anhydrite material has been separated to a magnesium chloride concentration of between about 36% and about 40% by weight, and separating solid material from the resulting magnesium chloride-containing liquor.

3. A process for the production of purified magnesium chloride solution which comprises evaporating a potassium sulfate reject liquor which initially contains magnesium in a concentration up to about 6.5% by weight at a temperature between about 100° C. and about 117° C. to a magnesium concentration of between 8% and about 8.9% by weight, separating solid material from the resulting mixture, diluting the resulting liquor with water to a magnesium concentration to between about 6.7 and 8% by weight, heating the diluted mixture to a temperature between about 100° C. and about 115° V., adding sufficient calcium chloride to the hot liquor to precipitate residual sulfate ions in the liquor as anhydrite, separating solid anhydrite material from the resulting mixture, evaporating the resulting solution at a temperature between about 60° C. and about 125° C. to a magnesium chloride concentration of between about 36% and about 40% by weight and separating solid material from the resulting magnesium chloride-containing liquor.

4. A process for the production of a purified magnesium chloride solution which comprises evaporating a potassium sulfate reject liquor which initially contains magnesium in a concentration up to about 6.5% by weight at a temperature of between 100° C. and about 117° C. to a magnesium concentration of between about 8.0% and about 8.9% by weight, separating solid material from the evaporated mixture, diluting the resulting liquor with water to a magnesium concentration of between about 7.2% and about 7.5% by weight, heating the diluted mixture to a temperature between about 100° C. and about 115° C., adding sufficient amount of an aqueous solution of calcium chloride to the hot liquor to precipitate residual sulfate ions from the liquor as anhydrite, separating solid anhydrite material from the resulting mixture, evaporating the liquor from which anhydrite has been separated at a temperature between about 100° C. and about 115° C. to a magnesium chloride concentration of between about 36% and about 40% by weight, separating solid material therefrom, heating the resulting magnesium chloride solution at a temperature between about 170° C. and about 190° C. to obtain a concentrated magnesium chloride solution.

5. A process for the production of purified magnesium chloride solution which comprises evaporating the potassium sulfate reject liquor which initially contains magnesium in a concentration up to about 6.5% by weight to a temperature between about 100° C. and about 117° C. to a magnesium concentration of between about 8.3% and about 8.9% by weight, separating solid material from the evaporated mixture, diluting the resulting liquor with water to a magnesium concentration to between about 7.2% and about 7.5% by weight, heating the diluted mixture to a temperature between about 100° C. and about 115° C., adding sufficient aqueous calcium chloride solution to the heated liquor in order to precipitate residual sulfate ions from the liquor as anhydrite, and separating solid anhydrite from the liquor.

6. A process for the production of a purified magnesium chloride solution which comprises evaporating a potassium sulfate reject liquor which initially contains magnesium in a concentration up to about 6.5% by weight at a temperature between about 100° C. and about 117° C. to a magnesium concentration of between about 8.3% and about 8.9% by weight, separating solid material from the evaporated mixture, diluting the resulting liquor with water to a magnesium concentration of between about 7.2% and about 7.5% by weight, heating the diluted mixture to a temperature between about 100° C. and about 115° C., adding sufficient amount of an aqueous solution of calcium chloride to the heated liquor in order to precipitate residual sulfate ions from the liquor as anhydrite, and separating anhydrite from the resulting liquor, evaporating the liquor from which anhydrite has been separated at a temperature between about 100° C. and about 115° C. to a magnesium chloride concentration of between about 36% and about 40% by weight, separating solid material therefrom, heating the resulting magnesium chloride-containing solution at a temperature of between about 170° C. and about 190° C. to obtain a concentrated magnesium chloride solution.

References Cited in the file of this patent

UNITED STATES PATENTS

| Number | Name | Date |
|---|---|---|
| 1,871,411 | Heath | Aug. 9, 1932 |
| 2,413,292 | Christensen | Dec. 31, 1946 |
| 2,437,182 | Barr et al. | Mar. 2, 1948 |
| 2,473,534 | Lloyd | June 21, 1949 |
| 2,479,001 | Burke et al. | Aug. 16, 1949 |
| 2,687,339 | Dancy et al. | Aug. 24, 1954 |

FOREIGN PATENTS

| Number | Country | Date |
|---|---|---|
| 270,620 | Germany | Feb. 23, 1914 |